(12) United States Patent
Kimura

(10) Patent No.: US 11,935,399 B2
(45) Date of Patent: Mar. 19, 2024

(54) SENSING DEVICE, DEVICE MANAGEMENT APPARATUS FOR SENSING DEVICE, DEVICE SELECTING METHOD, AND DEVICE MANAGING METHOD

(71) Applicant: SONY CORPORATION, Tokyo (JP)

(72) Inventor: Manabu Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 215 days.

(21) Appl. No.: 17/250,236

(22) PCT Filed: May 13, 2019

(86) PCT No.: PCT/JP2019/018960
§ 371 (c)(1),
(2) Date: Dec. 21, 2020

(87) PCT Pub. No.: WO2020/003775
PCT Pub. Date: Jan. 2, 2020

(65) Prior Publication Data
US 2021/0174667 A1 Jun. 10, 2021

(30) Foreign Application Priority Data
Jun. 29, 2018 (JP) .................. 2018-123949

(51) Int. Cl.
*G08C 17/02* (2006.01)
*G01H 17/00* (2006.01)
(Continued)

(52) U.S. Cl.
CPC ............. *G08C 17/02* (2013.01); *G01H 17/00* (2013.01); *G01J 3/28* (2013.01); *H04L 67/12* (2013.01); *H04Q 9/02* (2013.01); *H04Q 2209/82* (2013.01)

(58) Field of Classification Search
CPC ........ G08C 17/00; G08C 17/02; G01H 17/00; G01J 3/28; H04L 67/12; H04L 67/125;
(Continued)

(56) References Cited

U.S. PATENT DOCUMENTS

| 10,732,037 B1* | 8/2020 | Reid ..................... G01J 3/0272 |
| 2012/0302840 A1* | 11/2012 | Kubo ..................... G16H 10/60 |
| | | 600/300 |

(Continued)

FOREIGN PATENT DOCUMENTS

| JP | 2011-120151 A | 6/2011 |
| JP | 2015-087864 A | 5/2015 |
| JP | 2017-091440 A | 5/2017 |

OTHER PUBLICATIONS

International Search Report and Written Opinion of PCT Application No. PCT/JP2019/018960, dated Jul. 23, 2019, 06 pages of ISRWO.

*Primary Examiner* — Orlando Bousono
(74) *Attorney, Agent, or Firm* — CHIP LAW GROUP

(57) ABSTRACT

Sensing devices in an installation state are flexibly managed and the sensing devices are controlled appropriately. The sensing devices each include a sensor, a selection control unit, and a notification unit. The sensor measures the ambient environment to generate a measurement signal. The selection control unit controls the selection state of the sensing device in response to the measurement signal from the sensor. The notification unit issues a notification that the sensing device has been selected in a case where the selection state indicates that the sensing device has been selected.

17 Claims, 16 Drawing Sheets

(51) Int. Cl.
*G01J 3/28* (2006.01)
*H04L 67/12* (2022.01)
*H04Q 9/02* (2006.01)

(58) Field of Classification Search
CPC ........ H04Q 9/00; H04Q 9/02; H04Q 2209/40; H04Q 2209/75; H04Q 2209/82; H04Q 2209/84; H04Q 2209/883; H04W 4/02; H04W 4/029; H04W 4/70; H04W 24/08; G06F 13/00
See application file for complete search history.

(56) References Cited

U.S. PATENT DOCUMENTS

| | | | |
|---|---|---|---|
| 2015/0055168 A1* | 2/2015 | Kato | G06F 3/1222 358/1.15 |
| 2015/0180880 A1* | 6/2015 | Nakano | H04L 63/0853 726/4 |
| 2015/0205508 A1* | 7/2015 | Kawasaki | G05B 15/02 715/771 |
| 2016/0203369 A1* | 7/2016 | Inutsuka | G06T 7/60 382/113 |
| 2017/0164224 A1* | 6/2017 | Min | H04W 4/70 |
| 2022/0172599 A1* | 6/2022 | Mehta | G08B 25/009 |

* cited by examiner

FIG. 4

DEVICE LIST

| | FORMAT IDENTIFIER 241 | DEVICE-TYPE IDENTIFIER 242 | DEVICE-UNIQUE IDENTIFIER 243 | BELONGING-GROUP IDENTIFIER 244 | TIME INFORMATION 245 | ADDITIONAL INFORMATION 246 |
|---|---|---|---|---|---|---|
| DEVICE #1 | | | | | | |
| DEVICE #2 | | | | | | |
| ⋮ | ⋮ | ⋮ | ⋮ | ⋮ | ⋮ | ⋮ |
| DEVICE #N | | | | | | |

FIG. 9
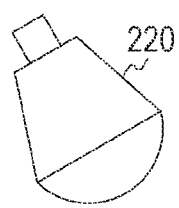
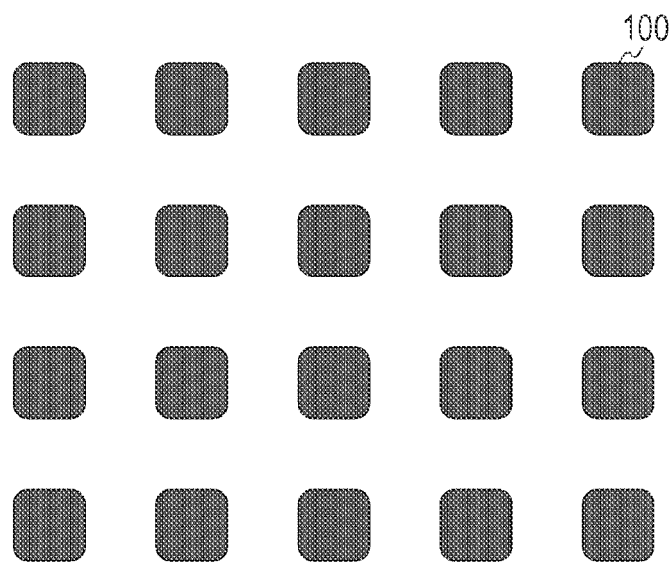

FIG. 14
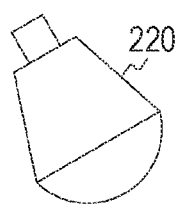
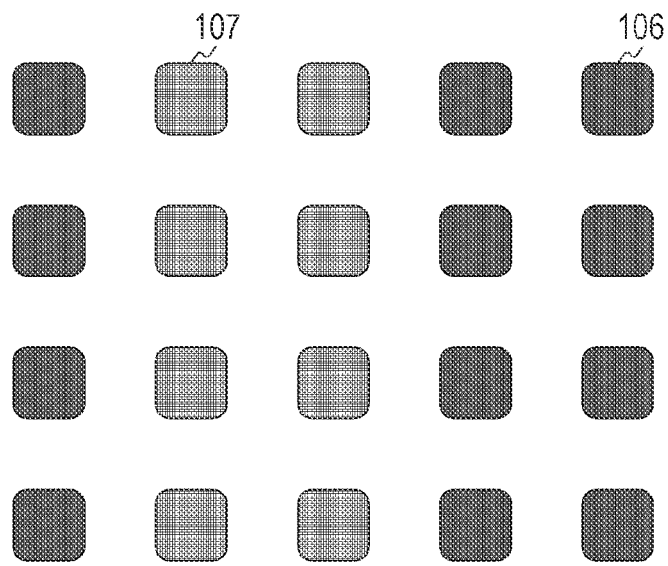

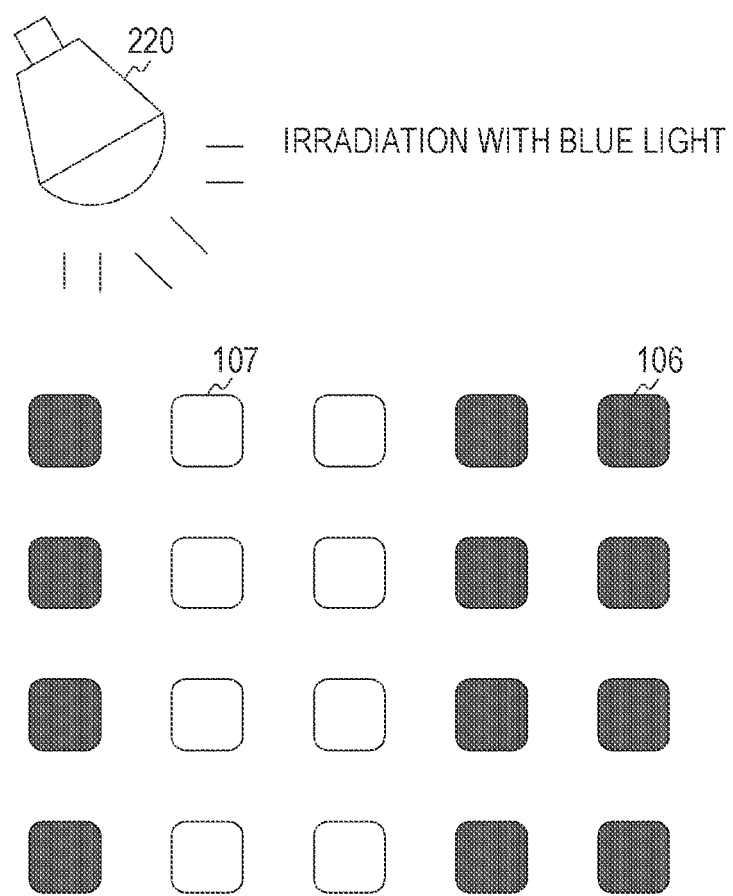

SENSING DEVICE, DEVICE MANAGEMENT APPARATUS FOR SENSING DEVICE, DEVICE SELECTING METHOD, AND DEVICE MANAGING METHOD

CROSS REFERENCE TO RELATED APPLICATIONS

This application is a U.S. National Phase of International Patent Application No. PCT/JP2019/018960 filed on May 13, 2019, which claims priority benefit of Japanese Patent Application No. JP 2018-123949 filed in the Japan Patent Office on Jun. 29, 2018. Each of the above-referenced applications is hereby incorporated herein by reference in its entirety.

TECHNICAL FIELD

The present technology relates to a sensing device. Specifically, the present technology relates to a sensing device including a sensor, a device management apparatus for the sensing device, and a processing method performed by the sensing device and the device management apparatus.

BACKGROUND ART

With the advent of the Internet of Things (IoT) era, IoT devices each equipped with a wireless communication function are rapidly becoming widespread. As an applied example of such IoT devices, there has been proposed, for example, a disaster prevention system including a plurality of terminals each of which observes with a sensor and transmits sensor information related to the observation by wireless communication and a control apparatus that predicts a disaster on the basis of the sensor information (refer to, for example, Patent Document 1).

CITATION LIST

Patent Document

Patent Document 1: Japanese Patent Application Laid-Open No. 2017-091440

SUMMARY OF THE INVENTION

Problems to be Solved by the Invention

In the above conventional technology, the plurality of terminals (IoT devices) each having a sensor function is installed and collects sensor information. An increase in such IoT devices in the future results in complicated management for the individual IoT devices. For example, flexible management is required in movement after installation of the IoT devices.

The present technology is created in view of such a situation, and an object of the present technology is to flexibly manage devices in an installation state and control the devices appropriately.

Solutions to Problems

The present technology has been made in order to solve the above issues. According to a first aspect of the present technology, provided are a sensing device and a method of selecting the sensing device, the sensing device including: a sensor configured to measure an ambient environment to generate a measurement signal; a selection control unit configured to control a selection state of the sensing device in response to the measurement signal; and a notification unit configured to issue a notification that the sensing device has been selected in a case where the selection state indicates that the sensing device has been selected. Therefore, provided is the effect of selecting the sensing device in response to the measurement signal from the sensor and issuing the notification that the sensing device has been selected.

Furthermore, in this first aspect, along with the notification, the notification unit may further issue a notification of identification information for identifying the sensing device. Therefore, provided is the effect of identifying the selected sensing device by an apparatus that has received the notification.

Furthermore, in this first aspect, the identification information may include a device type of the sensing device. Therefore, provided is the effect of identifying the device type of the selected sensing device by the apparatus that has received the notification.

Furthermore, in this first aspect, the identification information may include a group to which the sensing device belongs. Therefore, provided is the effect of identifying the group to which the selected sensing device belongs by the apparatus that has received the notification.

Furthermore, in this first aspect, the selection control unit may cause, in a case where the measurement signal gives an instruction for selection of the sensing device, the selection state to transition such that the selection state indicates that the sensing device has been selected; and may cause, in a case where the measurement signal gives an instruction for deselection of the sensing device, the selection state to transition such that the selection state indicates that the sensing device has not been selected. Therefore, provided is the effect of selecting or deselecting the sensing device in response to the measurement signal from the sensor.

Furthermore, in this first aspect, further included may be a selection-state-information holding unit configured to hold the selection state. Therefore, provided is the effect of holding the selection state by the sensing device.

Furthermore, in this first aspect, further included may be a selection-acceptance-state holding unit configured to hold a selection-acceptance state indicating whether or not an instruction for changing the selection state of the sensing device is acceptable, in which the selection control unit may change the selection state only in a case where the selection-acceptance state indicates that the instruction for the changing is acceptable. Therefore, provided is the effect of improving the security in selection.

Furthermore, in this first aspect, further included may be a selection-acceptance-state changing unit configured to change the selection-acceptance state in accordance with an external instruction. Therefore, provided is the effect of externally controlling whether or not the selection is acceptable.

Furthermore, in this first aspect, the sensor may serve as an optical sensor, and may generate the measurement signal indicating that an instruction for selection of the sensing device has been given, in response to reception of light having a predetermined wavelength. Therefore, provided is the effect of selecting the sensing device with the light.

Furthermore, in this first aspect, the sensor may serve as a vibration sensor, and may generate the measurement signal indicating that an instruction for selection of the sensing device has been given, in response to reception of vibration having a predetermined frequency. Therefore, provided is the effect of selecting the sensing device with the vibration.

Furthermore, according to a second aspect of the present technology, provided are a device management apparatus and a device managing method for the device management apparatus, the device management apparatus including: a device-selection instruction unit configured to instruct at least part of a plurality of sensing devices each having a sensor to select the corresponding sensing device, with a signal measurable by the sensor; a device-selection-notification receiving unit configured to receive a notification from the selected sensing device among the plurality of sensing devices; and a management control unit configured to manage information regarding the selected sensing device, on the basis of the notification. Therefore, provided is the effect that the sensor of the sensing device selects the sensing device with the measurable signal and receives the notification from the sensing device.

Furthermore, in this second aspect, the notification may include identification information for the selected sensing device, and the management control unit may manage the identification information for the selected sensing device. Therefore, provided is the effect of identifying the selected sensing device.

Furthermore, in this second aspect, further included may be a device-list holding unit configured to hold information regarding the selected sensing device. Therefore, provided is the effect of flexibly managing the selected sensing device.

Effects of the Invention

According to the present technology, it will exhibit excellent effects that devices in an installation state can be flexibly managed and controlled appropriately. Note that the effects described herein are not necessarily limited, and thus any of the effects described in the present disclosure may be applicable.

BRIEF DESCRIPTION OF DRAWINGS

FIG. 4 illustrates an exemplary field configuration of a device list held in a device-list holding unit 240 in the embodiment of the present technology.

FIG. 9 illustrates a specific example of a plurality of IoT devices 100 and the device management apparatus 200 in the embodiment of the present technology.

FIG. 14 illustrates an exemplary mixed disposition of IoT devices different in types in the embodiment of the present technology.

FIG. 16 illustrates an exemplary selection instruction by irradiation with blue light from the device-selection instruction unit 220 in the embodiment of the present technology.

MODE FOR CARRYING OUT THE INVENTION

Figure 1:
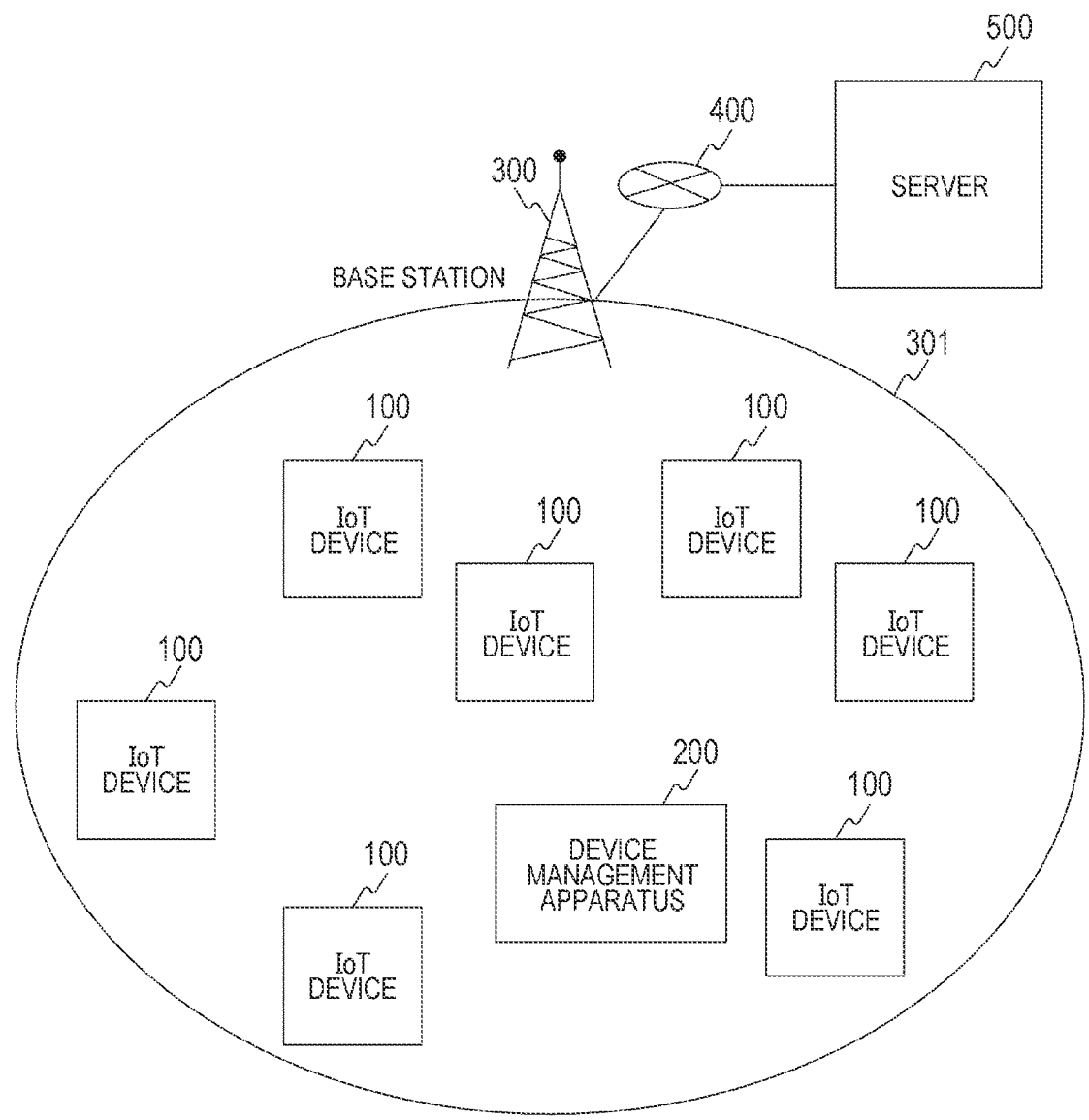
FIG. 1 illustrates an exemplary overall configuration of a sensing system in an embodiment of the present technology.

Hereinafter, a mode for carrying out the present technology (hereinafter, referred to as embodiment) will be described. The description will be given in the following order.
1. System Configuration
2. Operation
3. Selection Mode
<1. System Configuration>
[Overall Configuration]
FIG. 1 illustrates an exemplary overall configuration of a sensing system in the embodiment of the present technology.

This sensing system includes a plurality of IoT devices 100, a device management apparatus 200, a base station 300, and a server 500. The IoT devices 100 and the base station 300 are connected by wireless communication. The base station 300 and the server 500 are connected via a network 400.

Each of the IoT devices 100 is a sensing device having a wireless communication function and a sensor function. This IoT device 100 transmits a measurement result obtained by a sensor by wireless communication. Note that the IoT device 100 is an exemplary sensing device described in the claims.

The base station 300 is a base station that performs wireless communication with the IoT device 100. This base station 300 performs wireless communication with the IoT device 100 installed within a communication range 301. This base station 300 connects to the server 500 via the network 400, and transmits the measurement result from the IoT device 100 to the server 500.

The server 500 is a server that holds the measurement result from the IoT device 100. This server 500 connects the IoT device 100 via the network 400, and receives and holds the measurement result from the IoT device 100.

The device management apparatus 200 is a device that manages the IoT device 100. As will be described later, the device management apparatus 200 gives an instruction for selection or deselection of the IoT device 100, receives a notification from the IoT device 100, and creates a device list for managing the IoT device 100 on the basis of the notification.

[IoT Device]

Figure 2:
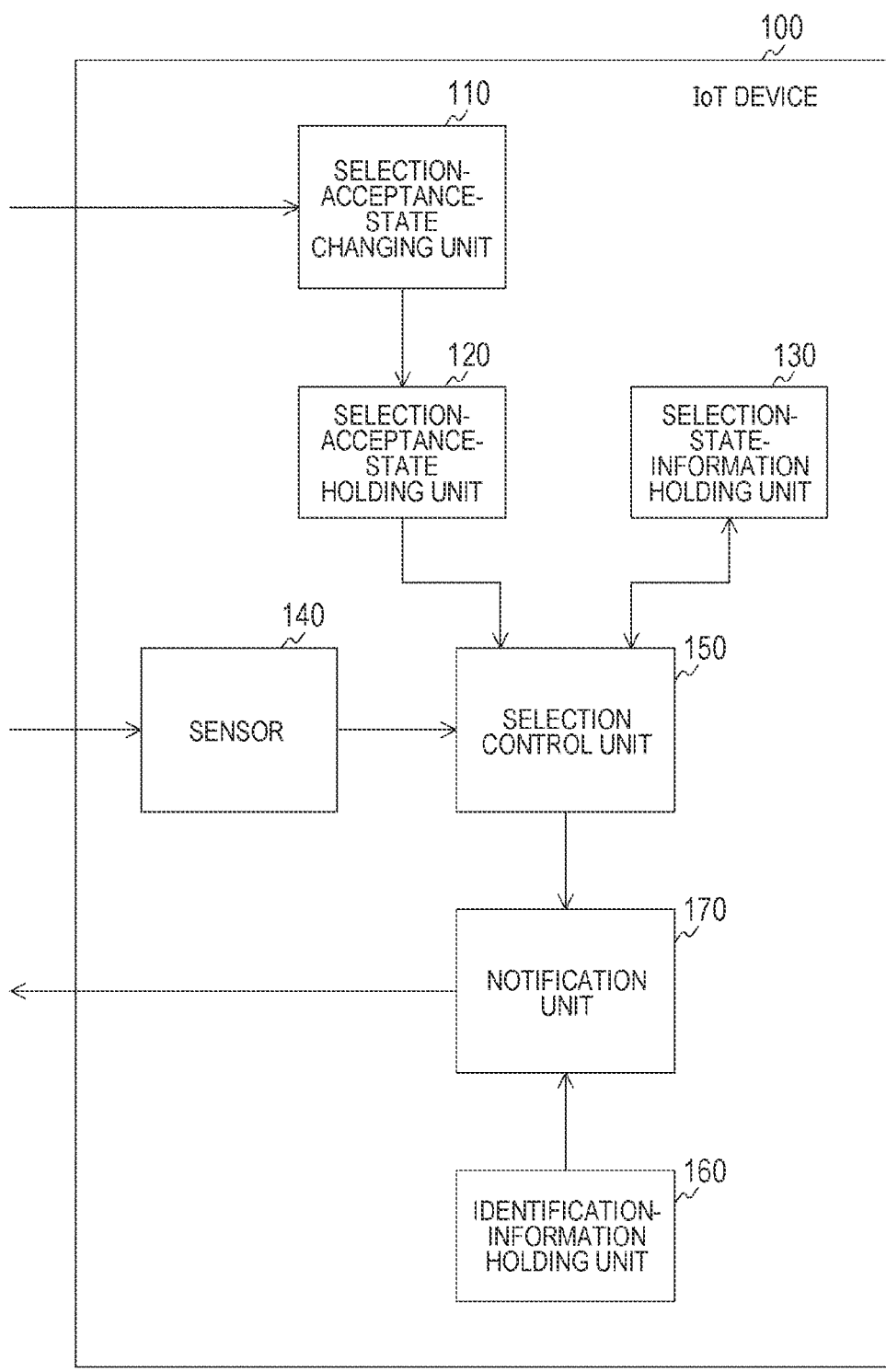
FIG. 2 is a diagram illustrating an exemplary configuration of an IoT device 100 in the embodiment of the present technology.

FIG. 2 is a diagram illustrating an exemplary configuration of the IoT device 100 in the embodiment of the present technology.

This IoT device 100 includes a selection-acceptance-state changing unit 110, a selection-acceptance-state holding unit 120, a selection-state-information holding unit 130, a sensor 140, a selection control unit 150, an identification-information holding unit 160, and a notification unit 170.

The selection-acceptance-state holding unit 120 holds a selection-acceptance state indicating whether or not the IoT device 100 is in a state of accepting a change of the selection state. This selection-acceptance-state holding unit 120 holds a "selectable state" if the IoT device 100 is in the state of accepting a change of the selection state, or holds a "non-selectable state" if the IoT device 100 is in a state of not accepting a change of the selection state.

The selection-acceptance-state changing unit 110 changes the selection-acceptance state held in the selection-acceptance-state holding unit 120. The selection-acceptance state is a concept provided in terms of security, and in the case of changing the selection state, it is assumed that an authorized person sets in advance the selection-acceptance state to the "selectable state". This setting can prevent a selection of the IoT device 100 against the intention of the authorized person. Therefore, under an environment where security is guaranteed by another approach, a secure mechanism by the selection-acceptance-state holding unit 120 and the selection-acceptance-state changing unit 110 may not be provided. Note that the function of this selection-acceptance-state changing unit 110 may be achieved with the sensor 140 and the selection control unit 150 as described later.

The selection-state-information holding unit 130 holds selection-state information indicating whether or not this IoT device 100 is in the selected state. The selection-state-information holding unit 130 holds the "selected state" if the IoT device 100 is in the selected state, or holds the "non-selected state" if not selected.

The sensor 140 measures the ambient environment by sensing operation to generate a measurement signal. This sensor 140 has a sensing function for measuring, for example, radio waves including visible light, infrared rays, and the like; sound waves; vibrations; and the like, and more specifically, an optical sensor, a vibration sensor, or the like is assumed.

In the present embodiment, the sensor 140 has a function as a selection accepting unit. That is, the selection of the IoT device 100 is accepted with the sensor 140 having a normal sensing function without separately providing a special mechanism for accepting the selection of the IoT device 100. This arrangement simplifies the configuration of the IoT device 100 and contributes to saving for power consumption. Note that this sensor 140 may accept not only an instruction for selection but also an instruction for deselection.

The selection control unit 150 controls the selection state of the IoT device 100. In a case where the measurement signal from the sensor 140 gives an instruction for selection of the IoT device 100, the selection control unit 150 causes the selection-state information held in the selection-state-information holding unit 130 to transition to the "selected state". On the other hand, in a case where the measurement signal from the sensor 140 gives an instruction for deselection of the IoT device 100, the selection control unit 150 causes the selection-state information held in the selection-state-information holding unit 130 to transition to the "non-selected state". However, in a case where the selection-acceptance state held in the selection-acceptance-state holding unit 120 indicates the "non-selectable state", these pieces of selection-state information cannot be changed.

Note that in a case where the same state is indicated before and after transition, the same state may be overwritten, or nothing may be written.

In addition, in a case where the sensor 140 does not accept the selection of the IoT device 100 even after the elapse of a certain period of time since the selection-acceptance-state changing unit 110 has changed the selection-acceptance state to the "selectable state", the selection-acceptance state may be caused to transition to the "non-selectable state" in view of security.

The identification-information holding unit 160 holds identification information for identifying the IoT device 100. As this identification information, a device-unique identifier uniquely assigned such that the IoT device 100 can be specified distinctively, a device-type identifier representing the type (device type) of the IoT device 100, and the like are assumed.

The notification unit 170 notifies the device management apparatus 200 that the IoT device 100 has been selected, in a case where the selection-state information held in the selection-state-information holding unit 130 is the "selected state". This notification unit 170 has, for example, a wireless communication function, and transmits a notification to the device management apparatus 200 by wireless communication. When issuing the notification that the IoT device 100 has been selected, the notification unit 170 also issues a notification of the identification information for the IoT device 100. This notification allows the device management apparatus 200 to grasp the information regarding the selected IoT device 100.

[Device Management Apparatus]

Figure 3:
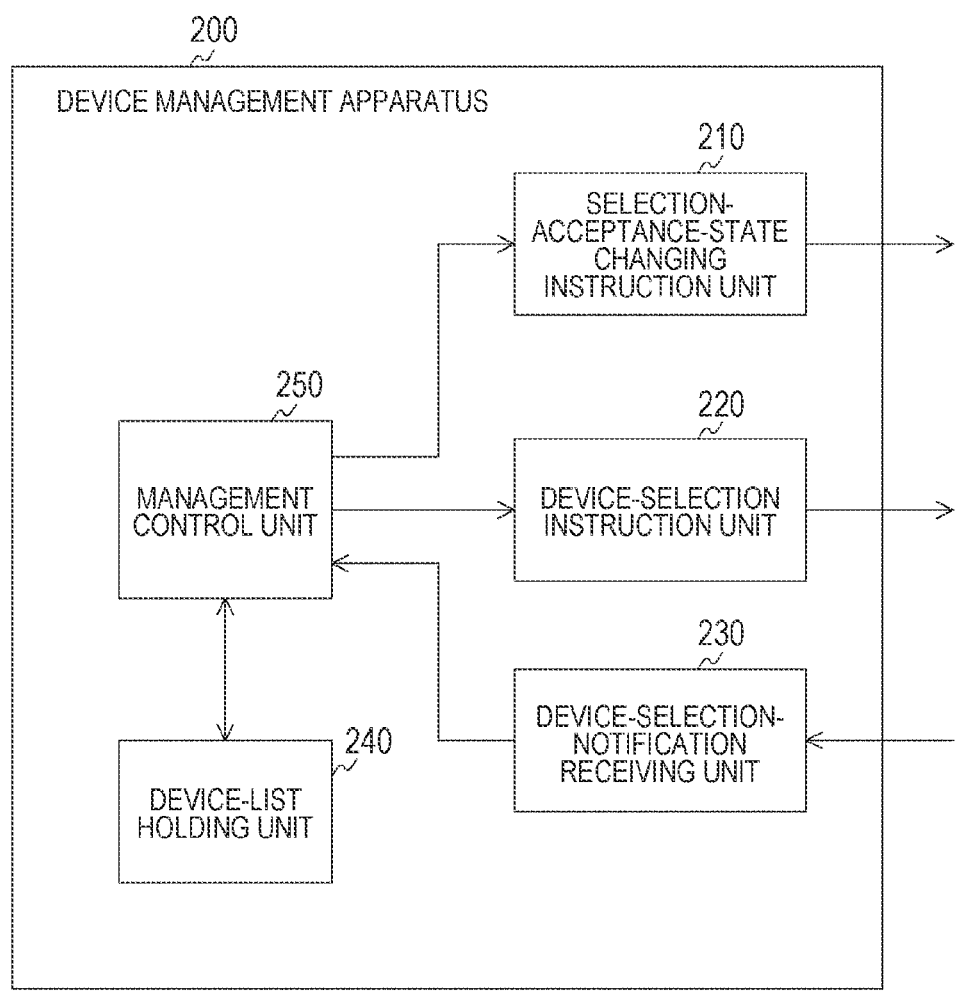
FIG. 3 is a diagram illustrating an exemplary configuration of a device management apparatus 200 in the embodiment of the present technology.

FIG. 3 is a diagram illustrating an exemplary configuration of the device management apparatus 200 in the embodiment of the present technology.

This device management apparatus 200 includes a selection-acceptance-state changing instruction unit 210, a device-selection instruction unit 220, a device-selection-notification receiving unit 230, a device-list holding unit 240, and a management control unit 250.

The selection-acceptance-state changing instruction unit 210 instructs at least part of the plurality of IoT devices 100 of changing the corresponding selection-acceptance state. This instruction is received by the selection-acceptance-state changing unit 110 of the IoT device 100, and the selection-acceptance state held in the selection-acceptance-state holding unit 120 is changed in response to the notification.

Note that, as described above, the selection-acceptance state is provided in view of security, and thus under an environment where security is guaranteed by another approach, the secure mechanism by the selection-acceptance-state changing instruction unit 210 may not be provided. In addition, there will be described the example in which the device management apparatus 200 includes the selection-acceptance-state changing instruction unit 210; however, the selection-acceptance state may be changed by an apparatus different from the device management apparatus 200.

The device-selection instruction unit 220 instructs at least part of the plurality of IoT devices 100 to select the corresponding IoT device 100. This instruction is sensed by the sensor 140 of the IoT device 100, and the selection-state information held in the selection-state-information holding unit 130 is set by the selection control unit 150 in response to the measurement signal. Thus, it is assumed that as an instruction by the device-selection instruction unit 220, for example, radio waves including visible light, infrared rays, and the like; sound waves; vibrations; or the like can be used in accordance with the sensing function of the sensor 140. Note that the device-selection instruction unit 220 may instruct the IoT device 100 not only to make a selection but also to make a deselection.

The device-selection-notification receiving unit 230 receives a notification from the IoT device 100 in response to the selection instruction. This notification is a notification issued by the notification unit 170 of the IoT device 100 in a case where the selection-state information of the IoT device 100 is the "selected state". This notification includes identification information for the IoT device 100, which allows the device management apparatus 200 to grasp the information regarding the selected IoT device 100.

The management control unit 250 controls each unit of the device management apparatus 200. That is, this management control unit 250 controls an instruction for changing the selection-acceptance state of the IoT device 100, an instruction for selecting the IoT device 100, and the like.

The device-list holding unit 240 holds a device list that is a list of IoT devices 100 each of which selection-state information is "selected state". This device list is created by the management control unit 250 on the basis of the notification received by the device-selection-notification receiving unit 230.

FIG. 4 illustrates an exemplary field configuration of the device list held in the device-list holding unit 240 in the embodiment of the present technology.

This device list includes fields of a format identifier 241, a device-type identifier 242, a device-unique identifier 243, a belonging-group identifier 244, time information 245, and additional information 246.

The format identifier 241 is information with which the identification information transmitted by the IoT device 100 can be recognized.

The device-type identifier 242 is information indicating the device type of the IoT device 100.

The device-unique identifier 243 is information with which the IoT device 100 can be specified distinctively. As the device-unique identifier 243, for example, there can be used a media access control (MAC) address of a network interface card (NIC) or a Bluetooth device (BD) address of Bluetooth (registered trademark). Furthermore, values obtained by converting these addresses in accordance with a certain rule may be used.

The belonging-group identifier 244 is information indicating a group selected as the IoT device 100. That is, as described later, each IoT device 100 may be selected on a group basis, and in that case, the IoT device 100 may be selected across a plurality of groups. Thus, it is assumed that a bit field corresponding to each group is provided and that selection or non-selection is expressed in binary form for the group to which the IoT device 100 belongs.

The time information 245 is information indicating the time when the IoT device 100 has been selected or the time when the selection state has been changed.

The additional information 246 is a field for storing other information, and is information that can be appropriately used by an application.

Figure 5:
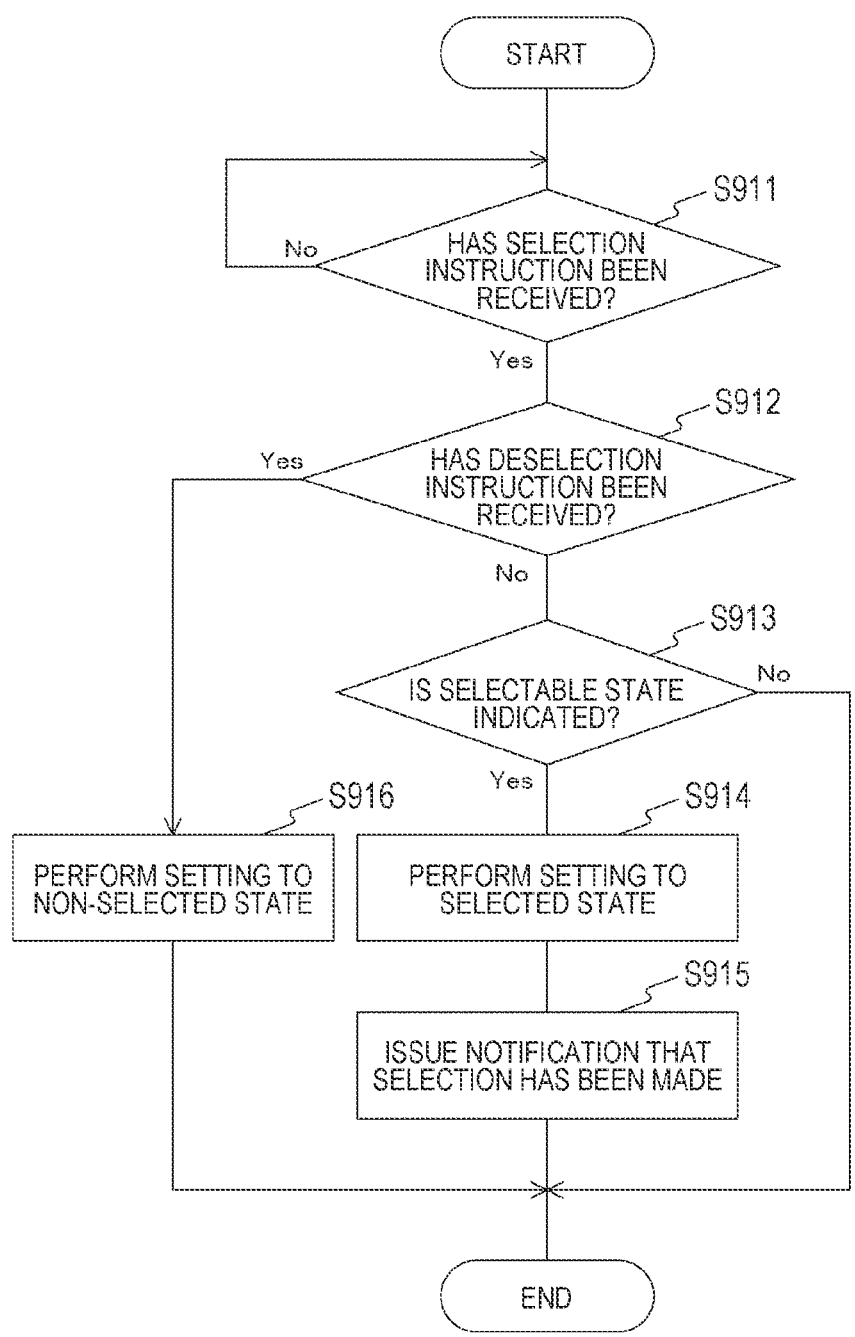
FIG. 5 is a flowchart illustrating an exemplary processing procedure of the IoT device 100 in the embodiment of the present technology.

<2. Operation>
[IoT Device]
FIG. 5 is a flowchart illustrating an exemplary processing procedure of the IoT device 100 in the embodiment of the present technology. Note that in this example, it is assumed that the selection-acceptance state held in the selection-acceptance-state holding unit 120 is set in advance.

First, the selection control unit 150 stands by until the sensor 140 receives a selection instruction from the device-selection instruction unit 220 of the device management apparatus 200 (step S911: No). In a case where the selection instruction has been received (step S911: Yes), the selection control unit 150 performs the following selection operation. However, even in the case of receiving the selection instruction, in a case where a deselection instruction has been further received (step S912: Yes), the selection-state information held in the selection-state-information holding unit 130 is set to the "non-selected state" (step S916).

In a case where no deselection instruction has been received (step S912: No), if the selection-acceptance state held in the selection-acceptance-state holding unit 120 indicates the "selectable state" (step S913: Yes), the selection-state information is set to the "selected state" (step S914). Then, the notification unit 170 notifies the device management apparatus 200 that the IoT device 100 has been selected (step S915). On the other hand, if the selection-acceptance state held in the selection-acceptance-state holding unit 120 indicates the "non-selectable state" (step S913: No), the processing ends without changing the selection-state information.

Figure 6:
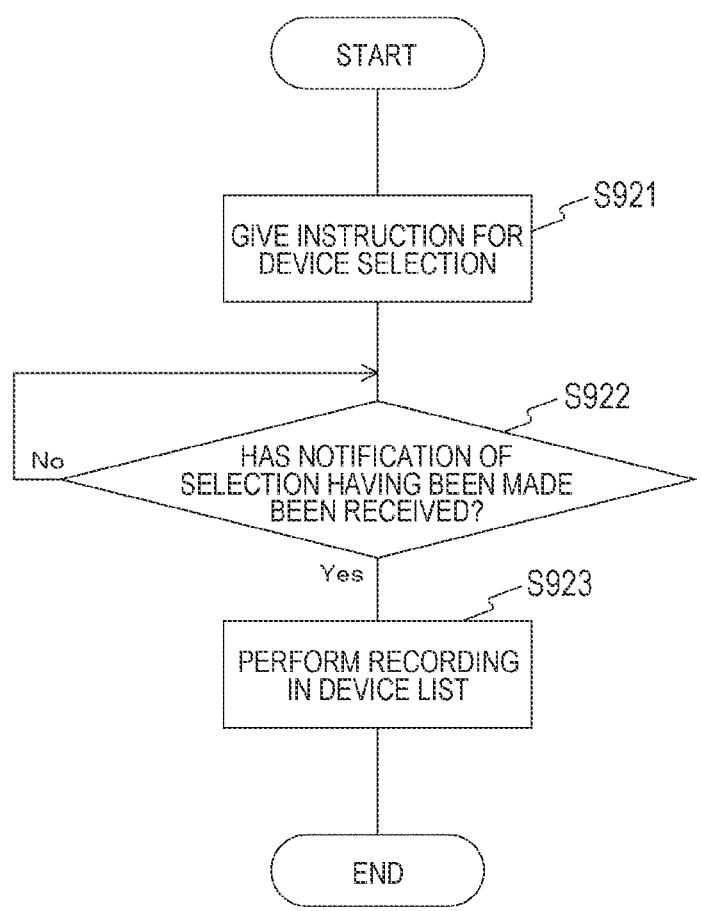
FIG. 6 is a flowchart illustrating an exemplary processing procedure of the device management apparatus 200 in the embodiment of the present technology.

[Device Management Apparatus]
FIG. 6 is a flowchart illustrating an exemplary processing procedure of the device management apparatus 200 in the embodiment of the present technology.

The device-selection instruction unit 220 instructs the selection target among the plurality of IoT devices 100 to select the corresponding IoT device 100 (step S921). Thereafter, the device-selection instruction unit 220 stands by until the notification that the selection has been made is received from the IoT device 100 to which the selection instruction has been given (step S922: No).

Then, after receiving the notification that the selection has been made from the IoT device 100 (step S922: Yes), the management control unit 250 creates a device list on the basis of the notification and records the device list in the device-list holding unit 240 (step S923).

Figure 7:
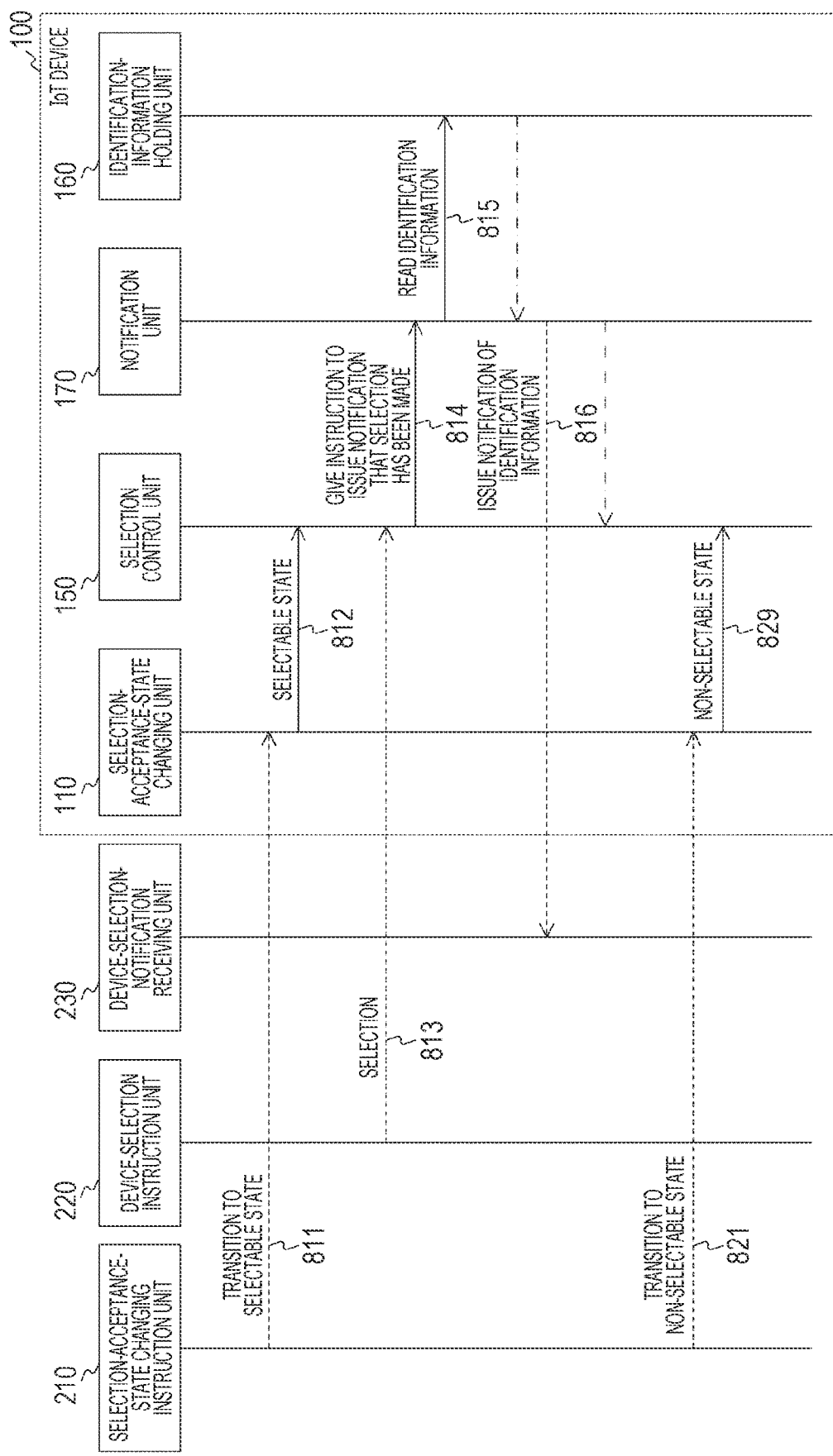
FIG. 7 is a sequence diagram illustrating exemplary overall processing of the sensing system in the embodiment of the present technology.

[Overall Processing]
FIG. 7 is a sequence diagram illustrating exemplary overall processing of the sensing system in the embodiment of the present technology.

The selection-acceptance-state changing instruction unit 210 instructs the IoT device 100 to make a transition of its selection-acceptance state to the "selectable state" (811). The selection-acceptance-state changing unit 110 causes the selection-acceptance state held in the selection-acceptance-state holding unit 120 to transition to the "selectable state" (812).

Thereafter, the device-selection instruction unit 220 instructs the IoT device 100 to select the IoT device 100 (813). In response to sensing of the instruction by the sensor 140, the selection control unit 150 causes the selection-state information held in the selection-state-information holding unit 130 to transition to the "selected state" and instructs the notification unit 170 to issue a notification that the selection has been made (814). In response to the instruction, the notification unit 170 reads the identification information from the identification-information holding unit 160 (815) and notifies the device management apparatus 200 (816).

Thereafter, the selection-acceptance-state changing instruction unit 210 instructs the IoT device 100 to make a transition of its selection-acceptance state to the "non-selectable state" (821). The selection-acceptance-state changing unit 110 causes the selection-acceptance state held in the selection-acceptance-state holding unit 120 to transition to the "non-selectable state" (829).

[Modification]

Figure 8:
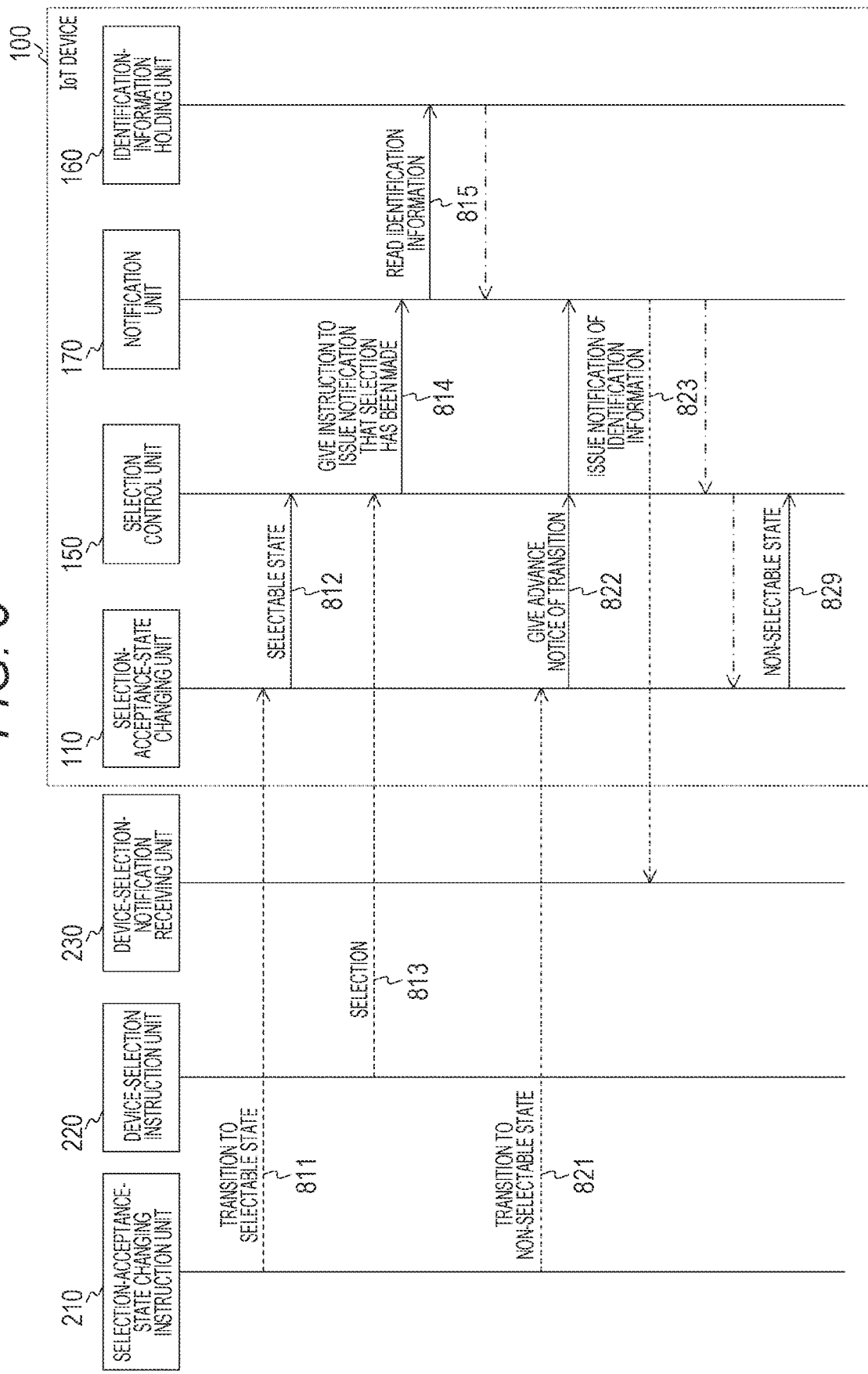
FIG. 8 is a sequence diagram illustrating a modification of the overall processing of the sensing system in the embodiment of the present technology.

FIG. 8 is a sequence diagram illustrating a modification of the overall processing of the sensing system in the embodiment of the present technology. In the above example, in the case where the IoT device 100 has been selected, the notification unit 170 issues a notification that the selection has been made. After once the IoT device 100 has been selected, a notification of the identification information may be issued on a regular basis. Alternatively, instead of issuing a notification of the identification information immediately, the notification unit 170 may perform recording that the selection has been made and may issue the notification at a predetermined timing. In this modification, there will be described an example in which a notification is given at the timing when the selection acceptance is finished and the selection-acceptance state transitions to the "non-selectable state".

In this modification, similarly to the above example, the selection-acceptance-state changing instruction unit 210 instructs an IoT device 100 to make a transition of its selection-acceptance state to the "selectable state" (811). Thereafter, the subsequent processing is performed similarly to the above example until the notification unit 170 reads the identification information from the identification-information holding unit 160 (815).

Thereafter, the selection-acceptance-state changing instruction unit 210 instructs the IoT device 100 to make a transition of its selection-acceptance state to the "non-selectable state" (821), and when the instruction for the transition is noticed to the selection control unit 150, a notification is issued at this timing (822). That is, the notification unit 170 notifies the device management apparatus 200 (823) of the identification information read from the identification-information holding unit 160 (815). Then, the selection-acceptance-state changing unit 110 causes the selection-acceptance state held in the selection-acceptance-state holding unit 120 to the "non-selectable state" (829).

<3. Selection Mode>

[Selection and Deselection]

FIG. 9 illustrates a specific example of the plurality of IoT devices 100 and the device management apparatus 200 in the embodiment of the present technology.

This example illustrates that, as the device-selection instruction unit 220, a lighting that emits visible light is used with assumption that the sensor 140 of each IoT device 100 serves as an optical sensor. Even in a case where a large number of IoT devices 100 are installed scatteringly in an area, if visible light enables selection and deselection, an IoT device group depending on a purpose can be selected within a range of irradiation with the visible light. Note that in the following example, it is assumed that the selection-acceptance state of the IoT device 100 is the "selectable state".

Figure 10:
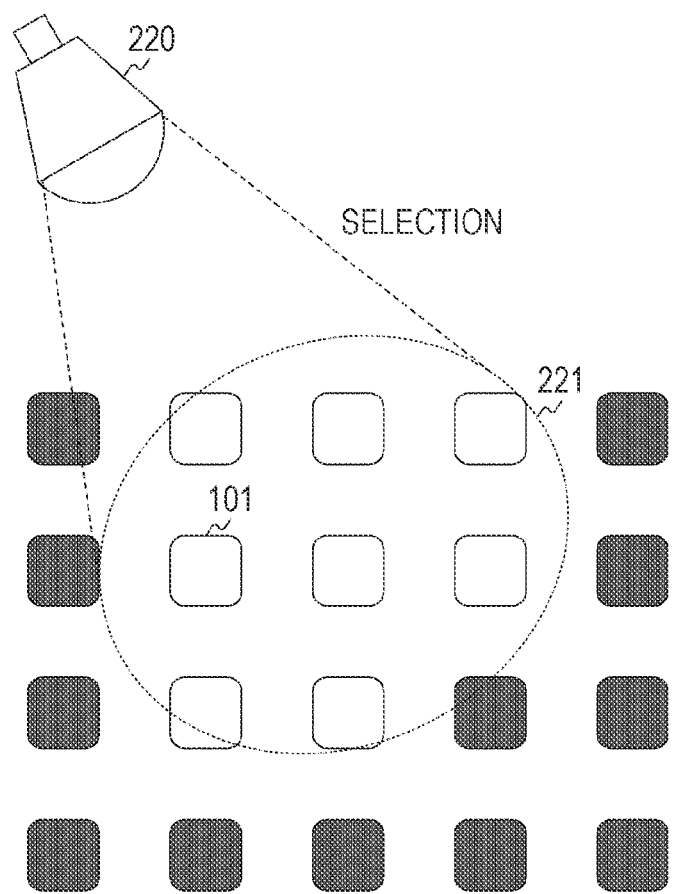
FIG. 10 illustrates an exemplary selection instruction with a lighting as a device-selection instruction unit 220 in the embodiment of the present technology.

FIG. 10 illustrates an exemplary selection instruction with the lighting as the device-selection instruction unit 220 in the embodiment of the present technology.

In this example, visible light that gives an instruction for selection is emitted from the device-selection instruction unit 220, and an area 221 including part of the plurality of IoT devices 100 is irradiated with the visible light. This irradiation causes the selection-state information of an IoT device 101 present in the area 221 to transition to the "selected state".

Figure 11:
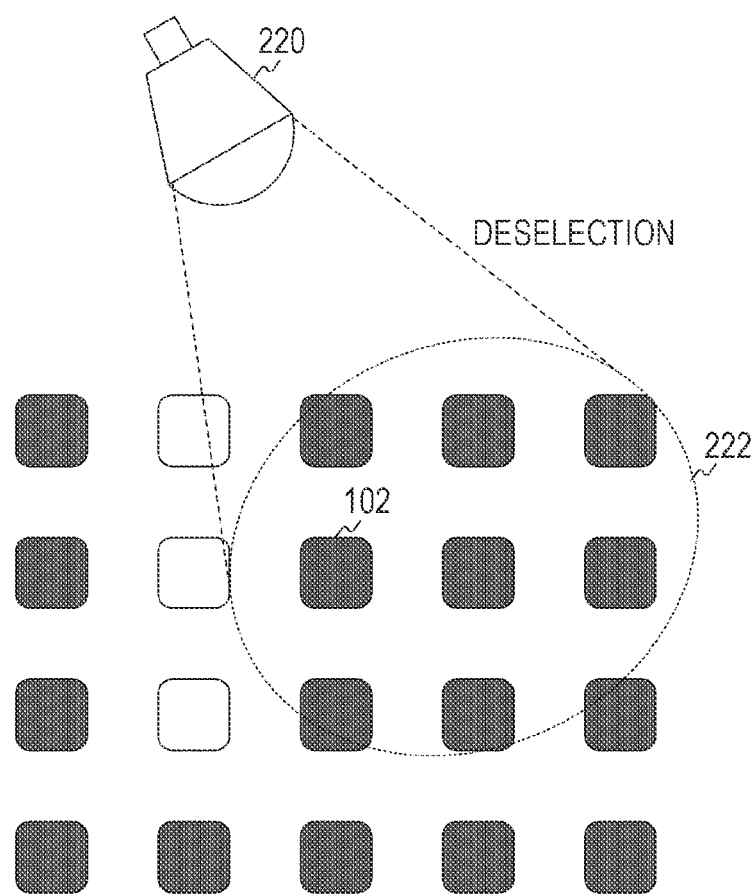
FIG. 11 illustrates an exemplary deselection instruction with the lighting as the device-selection instruction unit 220 in the embodiment of the present technology.

FIG. 11 illustrates an exemplary deselection instruction with the lighting as the device-selection instruction unit 220 in the embodiment of the present technology.

In this example, visible light that gives an instruction for deselection is emitted from the device-selection instruction unit 220, and an area 222 including part of the plurality of IoT devices 100 is irradiated with the visible light. This irradiation causes the selection-state information of an IoT device 102 present in the area 222 to transition to the "non-selected state".

As a result, the selection-state information of the IoT device 101 present in the area 221 and not present in the area 222 becomes the "selected state", and a notification of the identification information is issued at a predetermined later timing.

[Group]

Each IoT device 100 may be selected on a group basis. In this case, the IoT device 100 may be selected across a plurality of groups.

Figure 12:
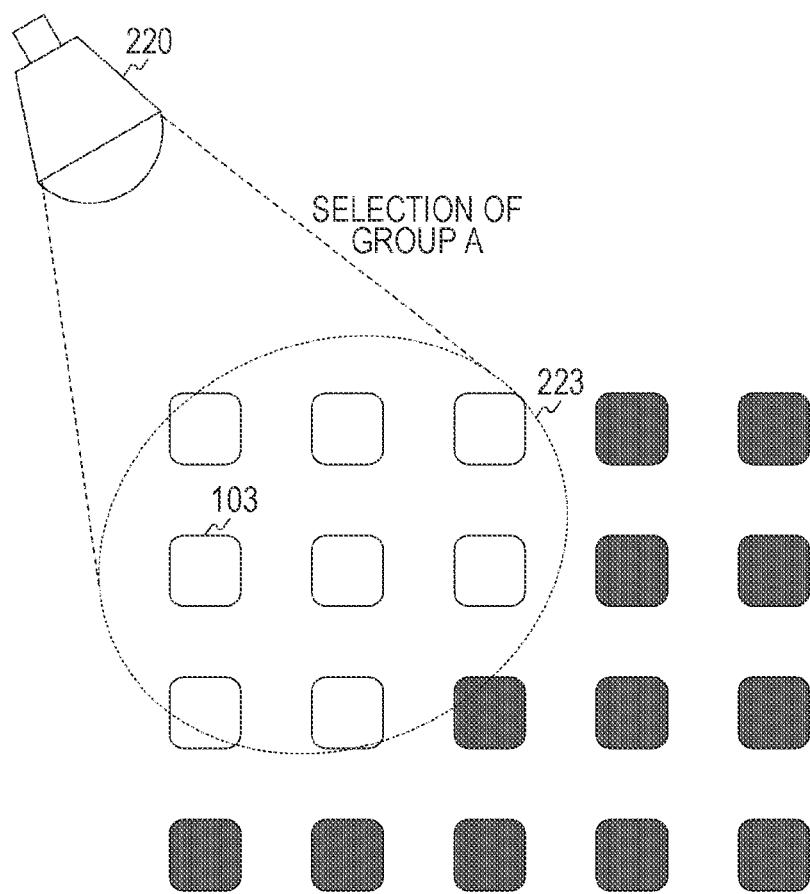
FIG. 12 illustrates an exemplary selection instruction for a group A with the lighting as the device-selection instruction unit 220 in the embodiment of the present technology.

FIG. 12 illustrates an exemplary selection instruction for a group A with the lighting as the device-selection instruction unit 220 in the embodiment of the present technology.

In this example, visible light that gives an instruction for selection of the group A is emitted from the device-selection instruction unit 220, and an area 223 including part of the plurality of IoT devices 100 is irradiated with the visible light. This irradiation causes, as the group A, the selection-state information of an IoT device 103 present in the area 223 to transition to the "selected state".

Figure 13:
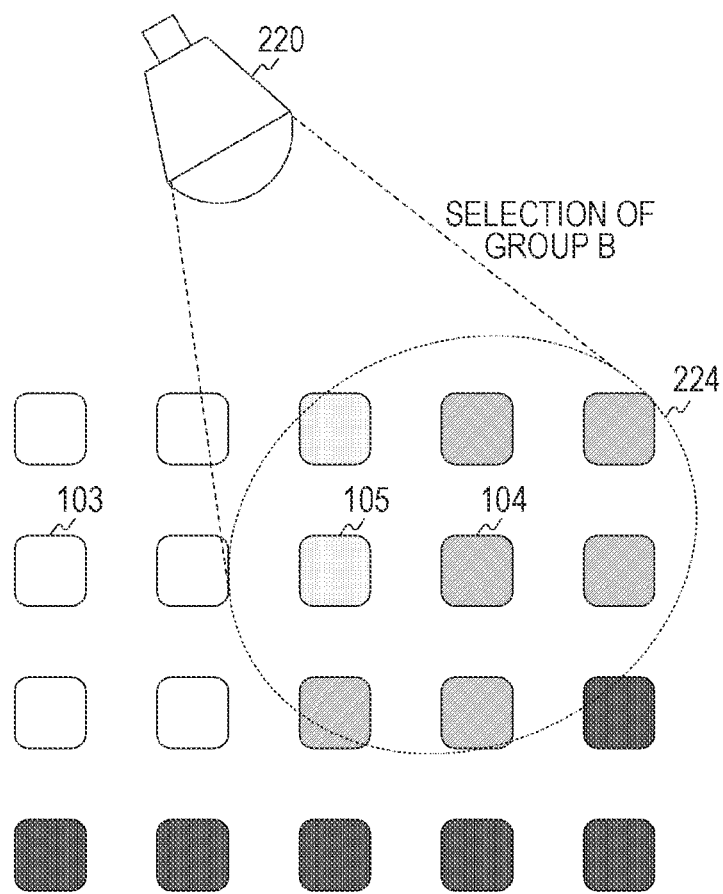
FIG. 13 illustrates an exemplary selection instruction for a group B with the lighting as the device-selection instruction unit 220 in the embodiment of the present technology.

FIG. 13 illustrates an exemplary selection instruction for a group B with the lighting as the device-selection instruction unit 220 in the embodiment of the present technology.

In this example, visible light that gives an instruction for selection of the group B is emitted from the device-selection instruction unit 220, and an area 224 including part of the plurality of IoT devices 100 is irradiated with the visible light. The visible light having given the instruction for the selection of the group B is different from the visible light having given the instruction for the selection of the group A. Thus, as the group B, the selection-state information of an IoT device 104 present in the area 224 transitions to the "selected state". However, an IoT device 105 present in the area 224 and having already been selected as the group A has been selected across the group A and the group B.

A notification of the groups to which each of the IoT devices 103 to 105 belongs are issued by the corresponding notification unit 170. After receiving this notification, the management control unit 250 of the device management apparatus 200 stores each of the groups in the device-list holding unit 240 as a bit field corresponding to the group, in the belonging-group identifier 244 of the device list. As a result, the device management apparatus 200 can manage the IoT devices 100 for each group.

[Discrimination with Color]

FIG. 14 illustrates an exemplary mixed disposition of IoT devices different in types in the embodiment of the present technology.

In this example, an IoT device 106 that recognizes as having been selected by irradiation with red light and an IoT device 107 that recognizes as having been selected by irradiation with blue light are disposed mixedly. In this case, if visible light having different wavelengths enables selection, an IoT device group depending on a purpose can be selected.

Figure 15:
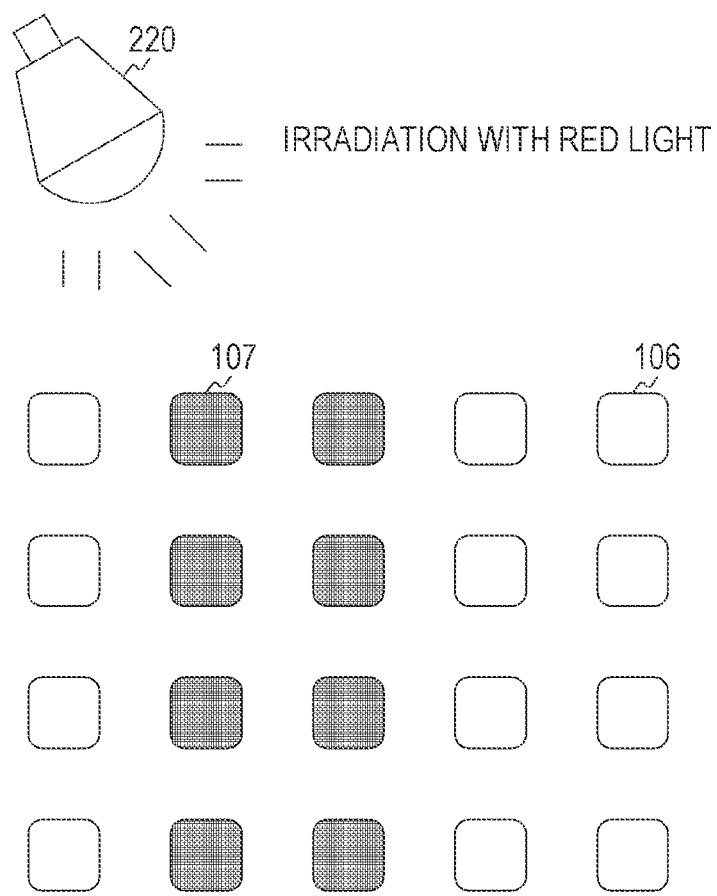
FIG. 15 illustrates an exemplary selection instruction by irradiation with red light from the device-selection instruction unit 220 in the embodiment of the present technology.

FIG. 15 illustrates an exemplary selection instruction by irradiation with red light from the device-selection instruction unit 220 in the embodiment of the present technology.

In this example, the irradiation with the red light from the device-selection instruction unit 220 causes the IoT device 106 to recognize that the IoT device 106 itself has been selected. As a result, the selection-state information of the IoT device 106 transitions to the "selected state".

FIG. 16 illustrates an exemplary selection instruction by irradiation with blue light from the device-selection instruction unit 220 in the embodiment of the present technology.

In this example, the irradiation with the blue light from the device-selection instruction unit 220 causes the IoT device 107 to recognize that the IoT device 107 itself has been selected. As a result, the selection-state information of the IoT device 107 transitions to the "selected state".

Note that in these examples, the operation of selection and deselection has been described assuming the optical sensor serving as the sensor 140; however, the sensor 140 may be another type of sensor. For example, in the case of an IoT device 100 having a vibration sensor that serves as the sensor 140, selection and deselection may be made in response to the sound of applause.

As described above, according to the embodiment of the present technology, the selection (and deselection) of an IoT device 100 can be accepted with the sensor 140 having a normal sensing function, without separately providing a special mechanism for accepting the selection of the IoT device 100. The selected IoT device 100 notifies the device management apparatus 200 of the identification information, with the notification unit 170. As a result, the device management apparatus 200 can generate a device list of the IoT device 100 in an installation state. That is, there is no need of creating and managing a management ledger for an individual IoT device 100 before operation, and even in a case where the disposition of the IoT device 100 is changed after the start of operation, flexible management can be performed in the latest installation state.

Note that the above embodiment illustrates one example for embodying the present technology, and the matters in the embodiment and the matters specifying the invention in the claims have a correspondence relationship. Similarly, the matters specifying the invention in the claims and the matters having the same names in the embodiment of the present technology have a correspondence relationship. The present technology, however, is not limited to the embodiment, and thus can be embodied by making various modifications to the embodiment without departing from the gist thereof.

Furthermore, the processing procedures described in the above embodiment may be regarded as a method including these series of procedures, or as a program for causing a computer to execute the series of procedures or as a recording medium that stores the program. As this recording medium, there can be used, for example, a compact disc (CD), a mini disc (MD), a digital versatile disc (DVD), a memory card, a Blu-ray (registered trademark) disc, or the like.

Note that the effects described in the present specification are merely exemplified and are not intended to be limitative, and there may be additional effects.

Note that the present technology can also have the following configurations.

(1) A sensing device including:
a sensor configured to measure an ambient environment to generate a measurement signal;
a selection control unit configured to control a selection state of the sensing device in response to the measurement signal; and
a notification unit configured to issue a notification that the sensing device has been selected in a case where the selection state indicates that the sensing device has been selected.

(2) The sensing device according to (1),
in which, along with the notification, the notification unit further issues a notification of identification information for identifying the sensing device.

(3) The sensing device according to (2),
in which the identification information includes a device type of the sensing device.

(4) The sensing device according to (2) or (3),
in which the identification information includes a group to which the sensing device belongs.

(5) The sensing device according to any of (1) to (4),
in which the selection control unit:
causes, in a case where the measurement signal gives an instruction for selection of the sensing device, the selection state to transition such that the selection state indicates that the sensing device has been selected; and,
causes, in a case where the measurement signal gives an instruction for deselection of the sensing device, the selection state to transition such that the selection state indicates that the sensing device has not been selected.

(6) The sensing device according to any of (1) to (5), further including:
a selection-state-information holding unit configured to hold the selection state.

(7) The sensing device according to any of (1) to (6), further including:
a selection-acceptance-state holding unit configured to hold a selection-acceptance state indicating whether or not an instruction for changing the selection state of the sensing device is acceptable,
in which the selection control unit changes the selection state only in a case where the selection-acceptance state indicates that the instruction for the changing is acceptable.

(8) The sensing device according to (7), further including:
a selection-acceptance-state changing unit configured to change the selection-acceptance state in accordance with an external instruction.

(9) The sensing device according to any of (1) to (8),
in which the sensor:
serves as an optical sensor; and
generates the measurement signal indicating that an instruction for selection of the sensing device has been given, in response to reception of light having a predetermined wavelength.

(10) The sensing device according to any of (1) to (9),
in which the sensor:
serves as a vibration sensor; and
generates the measurement signal indicating that an instruction for selection of the sensing device has been given, in response to reception of vibration having a predetermined frequency.

(11) A device management apparatus including:
a device-selection instruction unit configured to instruct at least part of a plurality of sensing devices each having a sensor to select the corresponding sensing device, with a signal measurable by the sensor;
a device-selection-notification receiving unit configured to receive a notification from the selected sensing device among the plurality of sensing devices; and
a management control unit configured to manage information regarding the selected sensing device, on the basis of the notification.

(12) The device management apparatus according to (11),
in which the notification includes identification information for the selected sensing device, and
the management control unit manages the identification information for the selected sensing device.

(13) The device management apparatus according to (12), further including:
a device-list holding unit configured to hold information regarding the selected sensing device.

(14) A device selecting method including:
measuring, by a sensor of a sensing device, an ambient environment to generate a measurement signal;
controlling, by a selection control unit, a selection state of the sensing device in response to the measurement signal; and
issuing, by a notification unit, a notification that the sensing device has been selected, in a case where the selection state indicates that the sensing device has been selected.

(15) A device managing method including:
instructing, by a device-selection instruction unit, at least part of a plurality of sensing devices each having a sensor to select the corresponding sensing device, with a signal measurable by the sensor;
receiving, by a device-selection-notification receiving unit, a notification from the selected sensing device among the plurality of sensing devices; and
managing, by a management control unit, information regarding the selected sensing device, on the basis of the notification.

REFERENCE SIGNS LIST 100 to 107 IoT device
110 Selection-acceptance-state changing unit
120 Selection-acceptance-state holding unit
130 Selection-state-information holding unit
140 Sensor
150 Selection control unit
160 Identification-information holding unit
170 Notification unit
200 Device management apparatus
210 Selection-acceptance-state changing instruction unit
220 Device-selection instruction unit
230 Device-selection-notification receiving unit
240 Device-list holding unit
241 Format identifier
242 Device-type identifier
243 Device-unique identifier
244 Belonging-group identifier
245 Time information
246 Additional information
250 Management control unit
300 Base station
400 Network
500 Server

The invention claimed is:
1. A sensing device, comprising:
a sensor configured to measure an ambient environment to generate a measurement signal, wherein the measurement signal gives an instruction for selection or deselection of the sensing device, and the selection or deselection of the sensing device is accepted with the sensor based on the instruction;
a selection control unit configured to control a selection state of the sensing device in response to the measurement signal received from the sensor; and
a notification unit configured to issue a notification that the sensing device has been selected based on the selection of the sensing device.

2. The sensing device according to claim 1,
wherein, along with the notification, the notification unit is further configured to issue a notification of identification information for identification of the sensing device.

3. The sensing device according to claim 2,
wherein the identification information includes a device type of the sensing device.

4. The sensing device according to claim 2,
wherein the identification information includes a group to which the sensing device belongs.

5. The sensing device according to claim 1,
wherein the selection control unit is further configured to:
cause, in a case the measurement signal received from the sensor gives the instruction for the selection of the sensing device, the selection state to transition such that the selection state indicates that the sensing device has been selected; and
cause, in a case the measurement signal received from the sensor gives the instruction for the deselection of the sensing device, the selection state to transition such that the selection state indicates that the sensing device has not been selected.

6. The sensing device according to claim 1, further comprising:
a selection-state-information holding unit configured to hold the selection state.

7. The sensing device according to claim 1, further comprising:
a selection-acceptance-state holding unit configured to hold a selection-acceptance state that indicates whether or not an instruction to change the selection state of the sensing device is acceptable,
wherein the selection control unit is further configured to change the selection state only in a case the selection-acceptance state indicates that the instruction for the change is acceptable.

8. The sensing device according to claim 7, further comprising:
a selection-acceptance-state changing unit configured to change the selection-acceptance state in accordance with an external instruction.

9. The sensing device according to claim 1,
wherein the sensor is further configured to:
serve as an optical sensor; and
generate the measurement signal that indicates that the instruction for the selection or deselection of the sensing device has been given, in response to reception of light of a predetermined wavelength.

10. The sensing device according to claim 1,
wherein the sensor is further configured to:
serve as a vibration sensor; and
generate the measurement signal that indicates that the instruction for the selection or deselection of the sensing device has been given, in response to reception of vibration of a predetermined frequency.

11. The sensing device according to claim 2, wherein the notification unit is further configured to issue the notification of the identification information of the selected sensing device at a predetermined time.

12. A device management apparatus, comprising:
a device-selection instruction unit configured to give an instruction to at least part of a plurality of sensing devices each having a sensor to select the corresponding sensing device, with a signal measurable by the sensor, and the selection of the corresponding sensing device is accepted with the sensor based on the instruction;

a device-selection-notification receiving unit configured to receive a notification from the selected sensing device among the plurality of sensing devices; and a management control unit configured to manage information regarding the selected sensing device, on a basis of the notification.

13. The device management apparatus according to claim 12, wherein the notification includes identification information for the selected sensing device, and the management control unit is further configured to manage the identification information for the selected sensing device.

14. The device management apparatus according to claim 13, further comprising:

a device-list holding unit configured to hold information regarding the selected sensing device.

15. The device management apparatus according to claim 12, further comprising:

a device-list holding unit configured to hold information regarding a time when the sensing device has been selected or a time when a selection state of the sensing device has been changed, based on the notification.

16. A device selecting method, comprising:

measuring, by a sensor of a sensing device, an ambient environment to generate a measurement signal, wherein the measurement signal gives an instruction for selection or deselection of the sensing device, and the selection or deselection of the sensing device is accepted with the sensor based on the instruction;

controlling, by a selection control unit, a selection state of the sensing device in response to the measurement signal received from the sensor; and issuing, by a notification unit, a notification that the sensing device has been selected, in a case where the selection state indicates that the sensing device has been selected.

17. A device managing method, comprising:

providing an instruction, by a device-selection instruction unit, to at least part of a plurality of sensing devices each having a sensor to select the corresponding sensing device, with a signal measurable by the sensor, wherein the selection of the corresponding sensing device is accepted with the sensor based on the instruction;

receiving, by a device-selection-notification receiving unit, a notification from the selected sensing device among the plurality of sensing devices; and managing, by a management control unit, information regarding the selected sensing device, on a basis of the notification.

* * * * *